US010938647B2

(12) United States Patent
Lewis et al.

(10) Patent No.: US 10,938,647 B2
(45) Date of Patent: Mar. 2, 2021

(54) EDGE DATABASE MANAGEMENT OF THE NETWORK DATA PLANE

(71) Applicant: CenturyLink Intellectual Property LLC, Broomfield, CO (US)

(72) Inventors: Ronald A. Lewis, Bastrop, LA (US); Stephen Opferman, Denver, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 11 days.

(21) Appl. No.: 16/523,741

(22) Filed: Jul. 26, 2019

(65) Prior Publication Data
US 2020/0403860 A1    Dec. 24, 2020

Related U.S. Application Data

(60) Provisional application No. 62/863,702, filed on Jun. 19, 2019.

(51) Int. Cl.
*H04L 12/24* (2006.01)
(52) U.S. Cl.
CPC .......... *H04L 41/0806* (2013.01); *H04L 41/12* (2013.01); *H04L 41/5022* (2013.01)
(58) Field of Classification Search
CPC .. H04L 41/0806; H04L 41/12; H04L 41/5022
USPC .......................................................... 709/223
See application file for complete search history.

(56) References Cited

U.S. PATENT DOCUMENTS

| 7,454,487 | B1 * | 11/2008 | Becher | ................ | H04L 41/0233 |
| | | | | | 707/999.2 |
| 10,558,542 | B1 * | 2/2020 | A | ........................ | G06F 11/3051 |
| 10,708,082 | B1 * | 7/2020 | Bakiaraj | ............. | H04L 12/4633 |
| 2004/0032852 | A1 * | 2/2004 | Thubert | ................ | H04W 48/17 |
| | | | | | 370/349 |
| 2007/0014248 | A1 * | 1/2007 | Fowlow | .................. | H04L 41/12 |
| | | | | | 370/254 |

(Continued)

FOREIGN PATENT DOCUMENTS

WO    WO-2019103978    5/2019

OTHER PUBLICATIONS

International Search Report and Written Opinion of the International Searching Authority, dated Sep. 17, 2020, Int'l Appl. No. PCT/US20/035550, filed Jun. 1, 2020; 19 pgs.

(Continued)

*Primary Examiner* — Wing F Chan
*Assistant Examiner* — Leon Y Tseng

(57) ABSTRACT

Novel tools and techniques for network data plane management are provided. A system includes a host machine that includes a database, processor, and non-transitory computer readable media comprising instructions executable by the processor to obtain, via the database, a network configuration, spawn a container according to the network configuration, wherein the container is configured, based on the network configuration, to be coupled to a network overlay via a network interface, receive, via the network interface, incoming data associated with the container, the incoming data having attached one or more attached network data attributes, and identify, via the database, the attached one or more network data attributes attached to the incoming data as one or more network data attributes of the network data model.

17 Claims, 5 Drawing Sheets

(56) References Cited

U.S. PATENT DOCUMENTS

2015/0381410 A1    12/2015   Strassner
2018/0284975 A1    10/2018   Carrier et al.

OTHER PUBLICATIONS

Zhang, Yan et al., "HERO: Hierarchical Energy Optimization for Data Center Networks", *IEEE Systems Journal* vol. 9, No. 2 Jun. 2015, pp. 406-415.

\* cited by examiner

EDGE DATABASE MANAGEMENT OF THE NETWORK DATA PLANE

CROSS REFERENCE TO RELATED APPLICATIONS

This application claims priority to U.S. Provisional Patent Application Ser. No. 62/863,702, filed Jun. 19, 2019 by Ronald A. Lewis et al., entitled "Edge Database Management of the Network Data Plane," the entire disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to network access systems and architecture, and more particularly to network access architectures for over the top network access solutions on existing infrastructure.

BACKGROUND

The network data plane is evolving. There are numerous Internet Engineering Tasks Force (IETF) attempts to define attributes to refine the method by which the network data plane manages (e.g., forwards) frames and packets. Existing physical networking hardware typically uses pre-programmed Application Specific Integrated Circuits (ASICs), which cannot make use of any attribute extensions.

Conventional approaches have turned to software defined network (SDN) data planes to address the need for extending the network data plane's ability to manage these attributes. These standard approaches rely on a key value store, which is essentially a two-dimensional data store limited in its ability to handle complex attributes.

Accordingly, tools and techniques for network data plane management via an edge database are provided.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
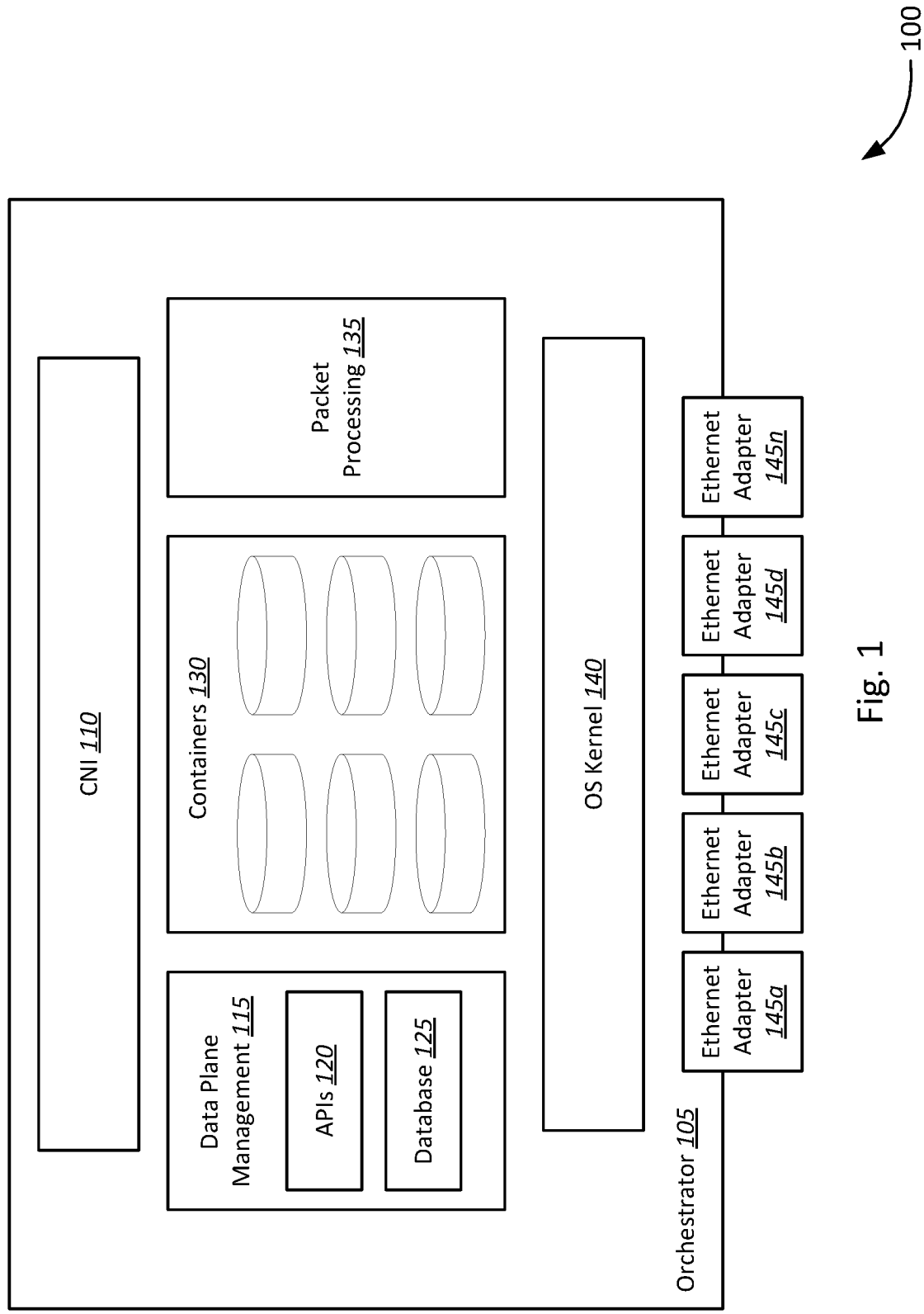
FIG. 1 is a schematic block diagram of a system for network data plane management, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method may comprise one or more procedures, any or all of which are executed by a computer system. Correspondingly, an embodiment may provide a computer system configured with instructions to perform one or more procedures in accordance with methods provided by various other embodiments. Similarly, a computer program may comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various modifications and additions can be made to the embodiments discussed without departing from the scope of the invention. For example, while the embodiments described above refer to specific features, the scope of this invention also includes embodiments having different combination of features and embodiments that do not include all the above described features.

In an aspect, a system for network data plane management is provided. The system includes a host machine configured to run a container orchestrator. The host machine may further include a database, a processor, and non-transitory computer readable media comprising instructions executable by the processor to perform various functions. The database may include a multi-dimensional data store configured to define a network data model, and further include a network configuration. The instructions may be executable by the processor to obtain, via the database, the network configuration; spawn a container according to the network configuration, wherein the container is configured to be coupled to a network overlay via a network interface. The instructions may further be executable by the processor to receive, via the network interface, incoming data associated with the container, the incoming data having attached one or more attached network data attributes, and identifying, via the database, the attached one or more network data attributes attached to the incoming data as one or more network data attributes of the network data model.

In another aspect, an apparatus for network data plane management is provided. The apparatus includes a processor and non-transitory computer readable media comprising instructions executable by the processor to obtain, via a database, a network configuration, and spawn a container according to the network configuration, wherein the container is configured, based on the network configuration, to be coupled to a network overlay via a network interface. The instructions may further be executable to receive, via the network interface, incoming data associated with the container, the incoming data having attached one or more attached network data attributes, and identify, via the database, the attached one or more network data attributes attached to the incoming data as one or more network data attributes of the network data model, and wherein the database comprises a multi-dimensional data store configured to define a network data model, wherein the network data model is configured to support one or more network data attributes.

In a further aspect, a method for network data plane management is provided. The method includes defining, at an edge database, a network data model configured to support one or more network data attributes, providing, via the edge database, a network configuration, and obtaining, via an orchestrator, the network configuration from the edge database. The method continues by spawning, via the orchestrator, a container according to the network configuration, wherein spawning the container further comprises coupling the container, based on the network configuration, to a network overlay via a network interface, receiving, via the network interface, incoming data associated with the container, the incoming data having attached one or more attached network data attributes, and identifying, via the database, the attached one or more network data attributes attached to the incoming data as one or more network data attributes of the network data model.

FIG. 1 is a schematic block diagram of a system for network data plane management. In various embodiments, the system 100 includes an orchestrator 105, further including a container network interface (CNI) 110, data plane management module 115, one or more application programming interfaces (API) 50, database 55, one or more containers 130, packet processing module 135, operating system (OS) kernel 140, and one or more ethernet adapters 145a-145n (collectively "ethernet adapters 145"). In various embodiments, the data plane management module 115 may include the one or more APIs and the database 55. It should be noted that the various components of the system 100 are schematically illustrated in FIG. 1, and that modifications to the system 100 may be possible in accordance with various embodiments.

In various embodiments, the orchestrator 105 may be a Kubernetes orchestrator configured to run on a host machine, such as a physical or virtual machine, and may also commonly be referred to as a node. In other embodiments, the orchestrator 105 may include different types of orchestrators, such as, without limitation, Mesos, Docker Swarm, or Openshift. In some embodiments, the host machine may be configured to run Linux or other suitable OS as known to those in the art. Accordingly, in one example, the underlying host machine for the orchestrator 105 may be a Linux host machine, configured to run a Kubernetes orchestrator.

The orchestrator 105 may include a CNI 110. The CNI 110 may be the interface between a container runtime and network implementation. Accordingly, in some embodiments, the CNI 110 may be an application programming interface (API) between container runtimes and network plugins. Thus, as will be appreciated by those skilled in the art, the container runtime is a network namespace, and the network plugin is the implementation that follows the specification of the CNI 110 that configures the container runtime to the network implementation. Typically, a network plugin is an executable, which when invoked, will read in, for example, a JavaScript Object Notation (JSON) config file to obtain required parameters to configure a container with the network. For example, the JSON config may contain an entry for a "net" plugin, configured to create interfaces for a container 130 to be coupled to a network, and an IP address management (IPAM) entry for allocating an internet protocol (IP) address to the container and/or container interface. In contrast, in some embodiments, the orchestrator may be configured to execute a plugin or otherwise interface with the data plane management module 115 to retrieve a configuration file from the database 55 for configuring a container to, for example, a persisted network configuration stored on the database 55.

The data plane management module 115 may include specific APIs 50 and database 55 configured to provide data plane management functions. In some embodiments, the database 55 may include, without limitation, a SQL, no-SQL, or hybrid SQL/no-SQL database, or other suitable database. Specifically, the data plane management module 115 may be configured to manage packet and frame attributes, utilize memory more efficiently, support an ability to re-factor (add, delete, change) attributes within the network data model, increase bandwidth, and increase frame and packet processing rates. As previously described, the IETF security automation and continuous monitoring (SACM) architecture proposes attribute extensions for data management and packet forwarding on the data plane. Typically, this has been handled by use of a key value store, such as a hash table or dictionary. In contrast with the traditional approach, the data plane management module 115 is configured to utilize database 55, which may support multi-dimensional data stores, such as a multi-dimensional array. For example, the database may include, without limitation, a SQL, no-SQL, or hybrid SQL/no-SQL database such as a HarperDB. For example, a hybrid database may be capable of blending both document and SQL structures/objects. In various embodiments, the multi-dimensional may include one or more layers, including, without limitation, a layer for a forwarding information base (FIB), and a prioritization layer, and/or other layers appropriately configured to manage the one or more additional attributes.

Specifically, the data plane management module 115 may be configured to address the implications of the Yet Another Next Generation (YANG) and Network Configuration Protocol (NETCONF) model and would provide the ability to handle the additional attributes added to the network data model. Accordingly, in various embodiments, the data plane management module 115 may be configured to enable existing network hardware and/or software to facilitate data plane management under the proposed network data model. As previously described, traditional key value store presents a bottleneck to flexibility, scalability, and performance.

Accordingly, in various embodiments, the data plane management module 115, and more specifically, the database 55 may be configured to define a network data model including one or more network data attributes. The one or more network data attributes may include, without limitation, quality of service, security, routing, switching, proof of origin, proof of delivery, and packet and frame behavior monitoring (e.g., predictive analytics support). In some further embodiments, the data plane management module 115 may further be configured to allow network attributes to be created, added, removed, or otherwise changed by a user, and/or prioritized dynamically. Accordingly, the data plane management module 115 may further include data plane APIs 50 configured to allow various data plane management functions to be invoked, such as, for example, dynamic attribute prioritization.

The one or more containers 130 may be spawned by the orchestrator, such as a Kubernetes engine, and/or, in some embodiments, by a container runtime, such as Docker. In various embodiments, the packet processing module 135 may be configured to process packets to and from the one or more containers 130, and according to the data plane management module 115. The OS kernel 140 may provide an interface to access the resources of the underlying system on which the orchestrator 105 may be running. The one or more ethernet adapters 145a-145n may be configured according to respective network overlays associated with each of the one or more containers 130 and/or according to the CNI 110. In some embodiments, containers of the one or more containers 130 may be configured with ethernet adapters, which may map to the one or more ethernet adapters 145a-145n. Thus, in various embodiments, the one or more ethernet adapters 145a-145n may be physical ethernet adapters, which may be shared or otherwise allocated between the one or more containers 130.

In various embodiments, the orchestrator 105 may deploy one or more container instances of the one or more containers 130. The CNI 110 may be configured to configure a container instance according to a network configuration. For example, CNI 110 may be configured to configure each container instance with a respective virtual network adapter, which may be coupled to a virtual switch. Thus, the CNI 110 may attach a container instance to a respective virtual network adapter. In various embodiments, the CNI 110 may further be configured to map namespaces to specific CNI network configurations. In some embodiments, binaries within individual container instances may themselves be associated with a network configuration specific to the container. In some further embodiments, a network overlay may be persisted within a container of the one or more containers 130 and/or, alternatively, for all containers spawned by the orchestrator 105. The data plane management module 115 may, in turn, be configured to define how the data plane is managed by respective containers of the one or more containers 130 and/or via the packet processing module 135. The data plane management module 115 may be configured to support network data attributes as described above. For example, the packet processing module 135 may be configured to manage packets received and/or transmitted via respective one or more ethernet adapters 145a-145n. The packets may include attribute information, which may be managed via the data plane management module 115, such as through the database 55. As previously described, the data plane management module may further define packet and/or network data attribute prioritization for data communicated to and from the one or more containers 130.

Figure 2:
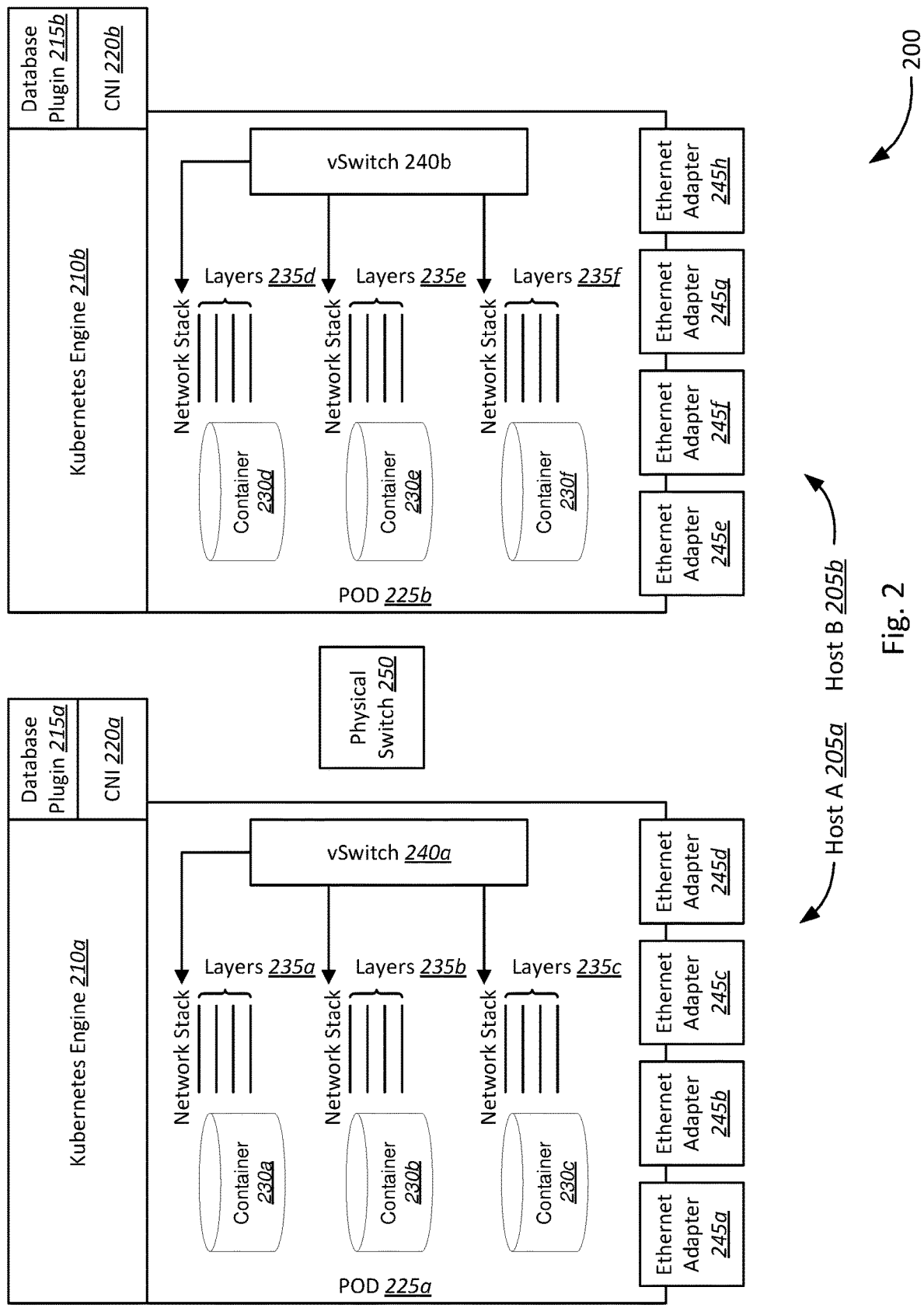
FIG. 2 is a schematic block diagram of a system for container communication in the same address space, in accordance with various embodiments.

FIG. 2 is a schematic block diagram of a system 200 for container communication in the same address space, in accordance with various embodiments. The system 200 includes Host A 205a including a respective Kubernetes Engine 210a, database plugin 215a, CNI 220a, container pod 225a, one or more containers 230a-230c, layers 235a-235c, virtual switch (vSwitch) 240a, and Ethernet adapters 245a-245d. The system 200 further includes Host B 205b, including respective Kubernetes Engine 210b, database plugin 215b, CNI 220b, container pod 225b, containers 230d-230f, layers 235d-235f, vSwitch 240b, and ethernet adapters 245e-245h. It should be noted that the various components of the system 200 are schematically illustrated in FIG. 2, and that modifications to the system 200 may be possible in accordance with various embodiments.

In various embodiments, Host A 205a may be a machine (physical or virtual), configured to support the Kubernetes engine 210a. Host B 205b may similarly be a machine (physical or virtual), configured to run the Kubernetes engine 210b. In some embodiments, the Host A 205a and Host B 205b may be executed on separate physical machines and coupled via the physical switch 250. In further embodiments, the Host A 205a and Host B 205b may, alternatively, be separate virtual machines running on a shared physical machine.

The Host A 205a may be configured to run Kubernetes engine 210a. The Kubernetes engine 210a may be configured to spawn a pod 225a of containers. For example, the pod 225a may include containers 230a-230c. Similarly, Host B 205b may be configured to run Kubernetes engine 210b, which may be configured to spawn a respective pod 225b of containers. The pod 225b may include containers 230d-230f.

Each of the containers 230a-230f may be spawned as layers. For example, the first container 230a may be spawned as a first set of layers 235a, the second container 230b may be spawned as a second set of layers 235b, continuing in this manner until the sixth container 230f, which may be spawned as a sixth set of layers 235f. Accordingly, containers 230a-230f may be spawned as layers 235a-235f with discrete memory mapping and predictable addressing space. The bottom layers may be immutable, while the top layer is dynamic. One immutable layer may be configured by the CNI 220a for a specific network overlay.

As previously described, addressing space in this layer may be broken into a representation of the vSwitch 240a plane. Rather than controlling the configuration of the networking layer via static environmental variables, read in from a high latency filesystem, data movement may be orchestrated via the use of a low latency data structure, as previously described. Use of an extensible data structure allows a wider virtual switch plane to be managed. For example, the Kubernetes engine 210a may be configured to communicate data between containers 230a-230c within the same pod 225a by exchanging the memory address of source data with the target/destination. In one example, the Kubernetes engine 210a may be configured to pass a double word memory pointer associated with the memory address of the source data to the target container 230a-230c. Thus, data and resources within the same address space, or alternatively, in the same name space, may be passed between intra-pod containers 230a-230c. This is in contrast with the traditional approach employing virtual bridges and virtual ethernet interfaces and/or via allocated ports on localhost.

Thus, containers 230a-230f may be coupled to respective vSwitch 240a, 240b, and further to respective network interfaces (such as respective Ethernet adapters 245a-245h) for inter-pod or external communications. For example, Host A 205a may be coupled, via the one or more ethernet adapters 245a-245d, to the physical switch 250, which may further be coupled to respective one or more ethernet adapters 245e-245h of the Host B 205b. Thus, inter-pod communications, on physically separate hosts, may utilize respective vSwitches 240a, 240b to manage communications to/from the respective containers 230a-230f.

In various embodiments, the database plugin 215a, 215b may further be configured to allow the Kubernetes engine 210a, 210b to implement data plane management as previously described. Specifically, the database plugin 215a, 215b may be configured to allow the Kubernetes engine 210a, 210b appropriately manage the network data plane. For example, as previously described, in various embodiments, the vSwitch 240a, 240b may be configured, via the CNI 220a, to appropriately manage one or more network data attributes. In some embodiments, the database plugin 215a, 215b may be configured provide an interface with a database, such as a SQL, no-SQL, or hybrid SQL/no-SQL database. For example, a hybrid database may be capable of blending both document and SQL structures/objects. One such database may be a HarperDB, or other such database as known to those skilled in the art.

The Kubernetes engine 210a, 210b, or specific container instances 230a-230f may be configured to utilize a network data model stored on the database. In some further embodiments, the Kubernetes engine 210a, 210b, or specific container instance 230a-230f may be configured to re-factor (add, delete, change) network data attributes within the network data model. In some embodiments, the one or more network data attributes may include, without limitation, quality of service, security, routing, switching, proof of origin, proof of delivery, and packet and frame behavior monitoring (e.g., predictive analytics support).

In various embodiments, as previously described, the database may be configured to support multi-dimensional data stores, such as a multi-dimensional array. In various embodiments, the multi-dimensional may include one or more layers, including, without limitation, a layer for a forwarding information base (FIB), and a prioritization layer, and/or other layers appropriately configured to manage the one or more additional attributes. Thus, the database may, in some embodiments, allow a network configuration to be persisted. The network configuration may be implemented by the Kubernetes engine 210a, 210b, and container instances 230a-230f may be configured to be coupled to the persisted network configuration (e.g., via the CNI 220a).

Figure 3:
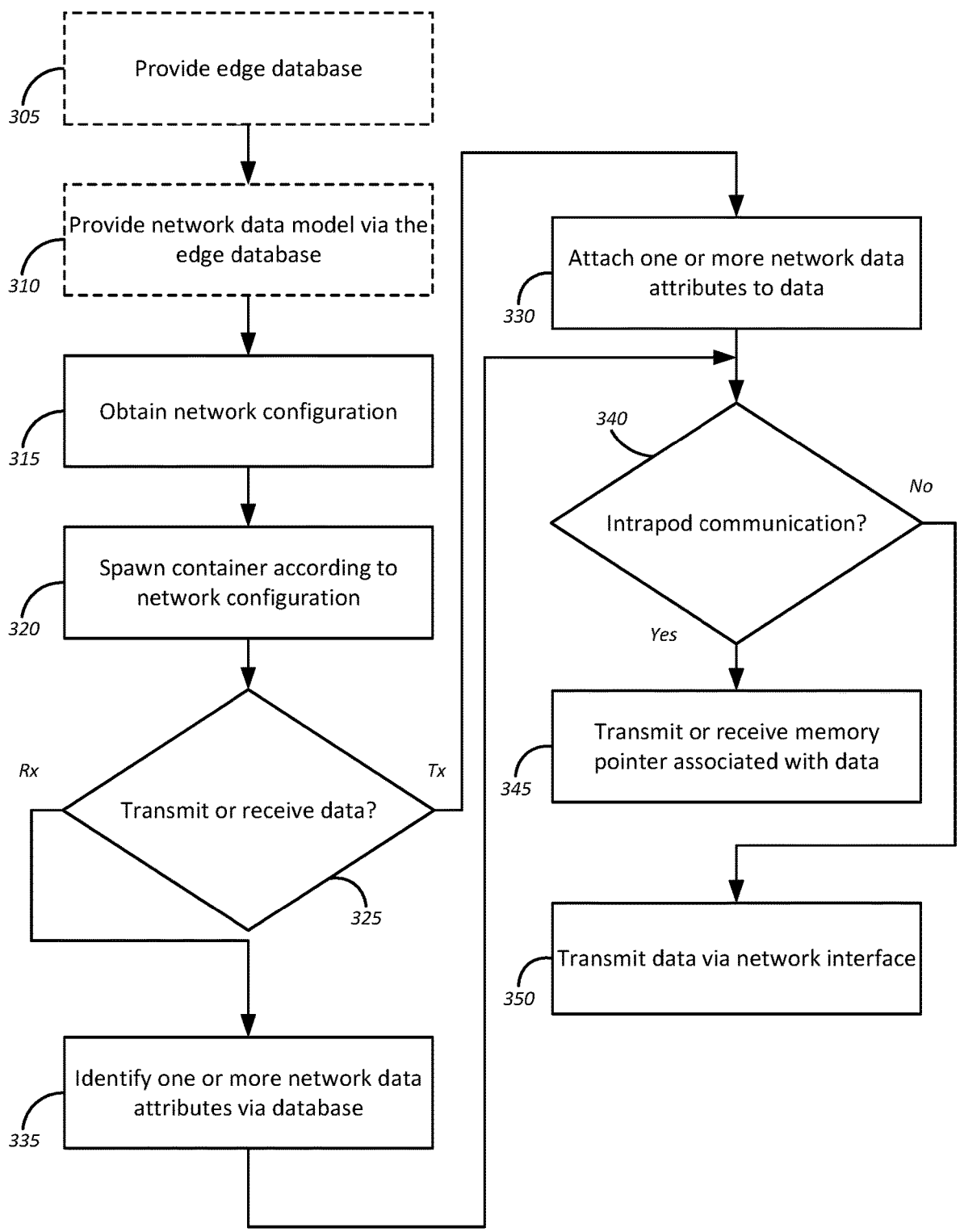
FIG. 3 is a flow diagram of a method for network data plane management, in accordance with various embodiments.

FIG. 3 is a flow diagram of a method 300 for network data plane management, in accordance with various embodiments. The method 300 begins, at optional block 305, by providing an edge database. As previously described, the edge database may be a database configured to support multi-dimensional data stores. In some embodiments, the edge database may be a database that is configured to be deployed on an edge device. In contrast with conventional databases, edge databases are databases specifically deployed locally on an edge device.

The method 300 continues, at optional block 310, by providing a network data model via the edge database. In various embodiments, the network data model may define one or more network data attributes that may be attached to data packets and/or frames and used for data plane management. The one or more network data attributes may include, without limitation, quality of service, security, routing, switching, proof of origin, proof of delivery, and packet and frame behavior monitoring (e.g., predictive analytics support). In some embodiments, the edge database may be configured to allow additional network attributes may be added and/or removed from the network data model. Moreover, the network data model may be made available to one or more container orchestrators, such as a Kubernetes engine, running on one or more host machines as previously described.

The method 300 continues, at block 315, by obtaining a network configuration. In some embodiments, this may include retrieving a network configuration file. In some examples, the network configuration file may read in by a CNI from the edge database. The network configuration may be configured to define a network overlay for one or more containers and/or one or more pods. Accordingly, at block 320, the method 300 further includes spawning a container according to the network configuration file.

At decision block 325, it is determined whether data is transmitted by the container or received by the container. If the data is received data, the method 300 continues, at block 335, by identifying one or more network data attributes attached to the data, via the network data model on the database. As previously described, the container and database may both be deployed on an edge device, and therefore, in some embodiments, the database may be an edge database. If the data is transmitted data, the method 300 continues, at block 330, by attaching one or more network data attributes to the data, as determined based on the container and/or host device sending the data, before the data is transmitted.

At decision block 340, it is determined whether the communication of data is intrapod communication. In various embodiments, the Kubernetes engine may configure the containers to be coupled to a network overlay, including packet processing logic and elements such as a vSwitch. Accordingly, the packet processing logic and/or specific virtual network elements may be configured to determine whether communication is between containers of the same pod (e.g., intrapod), and accordingly share the same name space and/or addressing space. If it is determined that the communications are intrapod communications, data transmitted or received from other containers on the same pod may be communicated, at block 345, by transmitting and/or receiving a memory pointer associated with the data to be communicated. If it is determined that communications are not intrapod, and instead cross pods and/or hosts, data may be transmitted via the appropriate network interface associated with the container transmitting and/or receiving the data.

Figure 4:
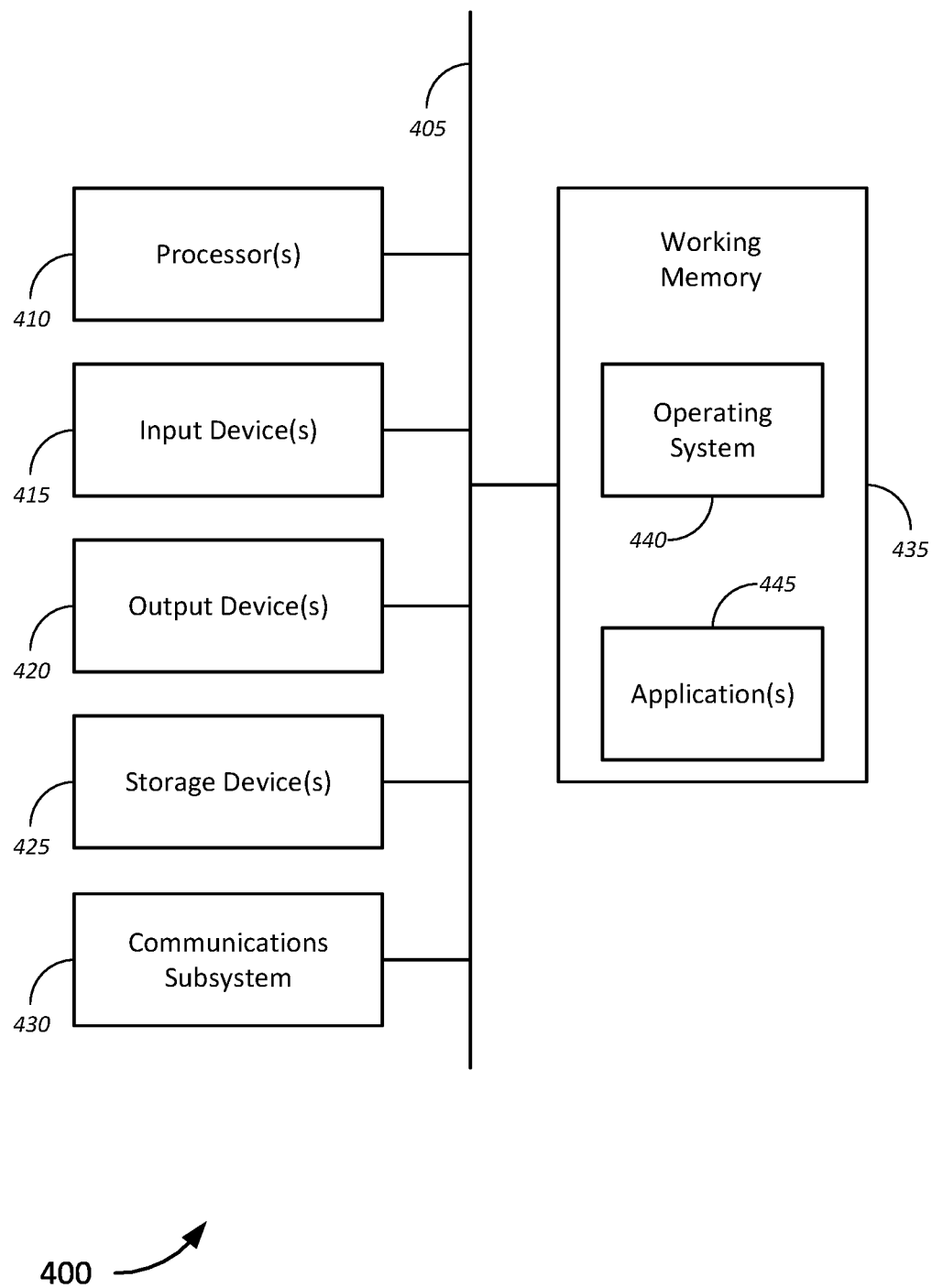
FIG. 4 is a schematic block diagram of a computer system for network data plane management, in accordance with various embodiments.

FIG. 4 is a schematic block diagram of a computer system 400 for network data plane management, in accordance with various embodiments. FIG. 4 provides a schematic illustration of one embodiment of a computer system 400, such as a host device, container node, or edge device, which may perform the methods provided by various other embodiments, as described herein. It should be noted that FIG. 4 only provides a generalized illustration of various components, of which one or more of each may be utilized as appropriate. FIG. 4, therefore, broadly illustrates how individual system elements may be implemented in a relatively separated or relatively more integrated manner.

The computer system 400 includes multiple hardware elements that may be electrically coupled via a bus 405 (or may otherwise be in communication, as appropriate). The hardware elements may include one or more processors 410, including, without limitation, one or more general-purpose processors and/or one or more special-purpose processors (such as microprocessors, digital signal processing chips, graphics acceleration processors, and microcontrollers); one or more input devices 415, which include, without limitation, a mouse, a keyboard, one or more sensors, and/or the like; and one or more output devices 420, which can include, without limitation, a display device, and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 400 may also include a communications subsystem 430, which may include, without limitation, a modem, a network card (wireless or wired), an IR communication device, a wireless communication device and/or chip set (such as a Bluetooth™ device, an 802.11 device, a WiFi device, a WiMax device, a WWAN device, a low-power (LP) wireless device, a Z-Wave device, a ZigBee device, cellular communication facilities, etc.). The communications subsystem 430 may permit data to be exchanged with a network (such as the network described below, to name one example), with other computer or hardware systems, between data centers or different cloud platforms, and/or with any other devices described herein. In many embodiments, the computer system 400 further comprises a working memory 435, which can include a RAM or ROM device, as described above.

The computer system 400 also may comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code may be encoded and/or stored on a non-transitory computer readable storage medium, such as the storage device(s) 425 described above. In some cases, the storage medium may be incorporated within a computer system, such as the system 400. In other embodiments, the storage medium may be separate from a computer system (i.e., a removable medium, such as a compact disc, etc.), and/or provided in an installation package, such that the storage medium can be used to program, configure, and/or adapt a general purpose computer with the instructions/code stored thereon. These instructions may take the form of executable code, which is executable by the computer system 400 and/or may take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) may also be used, and/or particular elements may be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 400) to perform methods in accordance with various embodiments of the invention. According to a set of embodiments, some or all of the procedures of such methods are performed by the computer system 400 in response to processor 410 executing one or more sequences of one or more instructions (which may be incorporated into the operating system 440 and/or other code, such as an application program 445 or firmware) contained in the working memory 435. Such instructions may be read into the working memory 435 from another computer readable medium, such as one or more of the storage device(s) 425. Merely by way of example, execution of the sequences of instructions contained in the working memory 435 may cause the processor(s) 410 to perform one or more procedures of the methods described herein.

The terms "machine readable medium" and "computer readable medium," as used herein, refer to any medium that participates in providing data that causes a machine to operate in a specific fashion. In an embodiment implemented using the computer system 400, various computer readable media may be involved in providing instructions/code to processor(s) 410 for execution and/or may be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 425. Volatile media includes, without limitation, dynamic memory, such as the working memory 435. In some alternative embodiments, a computer readable medium may take the form of transmission media, which includes, without limitation, coaxial cables, copper wire and fiber optics, including the wires that comprise the bus 405, as well as the various components of the communication subsystem 430 (and/or the media by which the communications subsystem 430 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer may load the instructions into its dynamic memory and send the instructions as signals over a transmission medium to be received and/or executed by the computer system 400. These signals, which may be in the form of electromagnetic signals, acoustic signals, optical signals, and/or the like, are all examples of carrier waves on which instructions can be encoded, in accordance with various embodiments of the invention.

The communications subsystem 430 (and/or components thereof) generally receives the signals, and the bus 405 then may carry the signals (and/or the data, instructions, etc. carried by the signals) to the working memory 435, from which the processor(s) 410 retrieves and executes the instructions. The instructions received by the working memory 435 may optionally be stored on a storage device 425 either before or after execution by the processor(s) 410.

Figure 5:
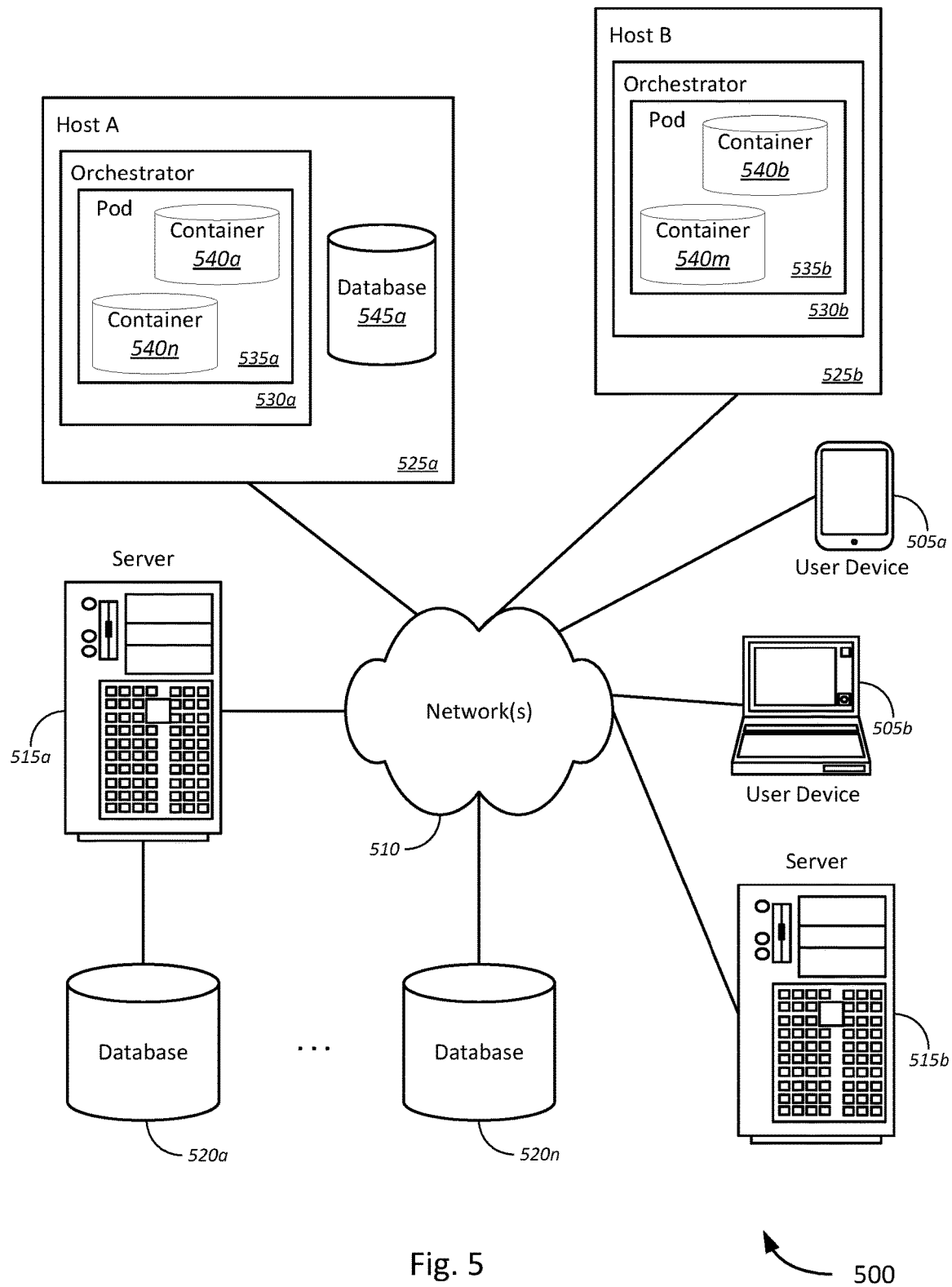
FIG. 5 is a schematic block diagram illustrating system of networked computer devices, in accordance with various embodiments.

FIG. 5 is a block diagram illustrating a networked system of computing systems, which may be used in accordance with various embodiments. The system 500 may include one or more user devices 505. A user device 505 may include, merely by way of example, desktop computers, single-board computers, tablet computers, laptop computers, handheld computers, and the like, running an appropriate operating system. User devices 505 may further include external devices, remote devices, servers, and/or workstation computers running any of a variety of operating systems. In some embodiments, the operating systems may include commercially-available UNIX™ or UNIX-like operating systems. A user device 505 may also have any of a variety of applications, including one or more applications configured to perform methods provided by various embodiments, as well as one or more office applications, database client and/or server applications, and/or web browser applications. Alternatively, a user device 505 may include any other electronic device, such as a thin-client computer, Internet-enabled mobile telephone, and/or personal digital assistant, capable of communicating via a network (e.g., the network (s) 510 described below) and/or of displaying and navigating web pages or other types of electronic documents. Although the exemplary system 500 is shown with two user devices 505, any number of user devices 505 may be supported.

Certain embodiments operate in a networked environment, which can include a network(s) 510. The network(s) 510 can be any type of network familiar to those skilled in the art that can support data communications, such as an access network, and using any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP 513, Bluetooth, Zigbee/Z-wave, TCP/IP, SNA™, IPX™, and the like. Merely by way of example, the network(s) 510 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network may include an access network of the service provider (e.g., an Internet service provider ("ISP")). In another embodiment, the network may include a core network of the service provider, management network, and/or the Internet.

Embodiments can also include one or more server computers 515. Each of the server computers 515 may be configured with an operating system, including, without limitation, any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 may be a data server, a web server, authentication server (e.g., TACACS, RADIUS, etc.), a cloud computing device(s), or the like, as described above. The data server may include (or be in communication with) a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of the invention.

The server computers 515, in some embodiments, may include one or more application servers, which can be configured with one or more applications, programs, web-based services, or other network resources accessible by a client. Merely by way of example, the server(s) 515 can be one or more general purpose computers capable of executing programs or scripts in response to the user computers 505 and/or other servers 515, including, without limitation, web applications (which may, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 505 and/or another server 515.

In accordance with further embodiments, one or more servers 515 can function as a file server and/or can include one or more of the files (e.g., application code, data files, etc.) necessary to implement various disclosed methods, incorporated by an application running on a user computer 505 and/or another server 515. Alternatively, as those skilled in the art will appreciate, a file server can include all necessary files, allowing such an application to be invoked remotely by a user computer, user device, or customer device 505 and/or server 515.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520a-520n (collectively, "databases 520"). The location of each of the databases 520 is discretionary: merely by way of example, a database 520a may reside on a storage medium local to (and/or resident in) a server 515a (or alternatively, user device 505). Alternatively, a database 520n can be remote so long as it can be in communication (e.g., via the network 510) with one or more of these. In a particular set of embodiments, a database 520 can reside in a storage-area network ("SAN") familiar to those skilled in the art. In one set of embodiments, the database 520 may be relational and/or non-relational database configured to host one or more data lakes collected from various data sources. The database may be controlled and/or maintained by a database server.

The system 500 may further include a first host (Host A) 525a, comprising an orchestrator 530a, pod 535, one or more containers 540a-540n, and database 545a. The system 500 may further include a second host (Host B) 525b, comprising an orchestrator 530b, pod 535b, and one or more containers 540b-540m.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
   a host machine configured to run a container orchestrator, the host machine comprising:
   a database comprising a multi-dimensional data store configured to define a network data model, wherein the network data model is configured to support one or more network data attributes, the database further comprising a network configuration;
   a processor; and
   non-transitory computer readable media comprising instructions executable by the processor to:
   obtain, via the database, the network configuration;
   spawn a container according to the network configuration, wherein the container is configured, based on the network configuration, to be coupled to a network overlay via a network interface;
   receive, via the network interface, incoming data associated with the container, the incoming data having attached one or more attached network data attributes;
   identify, via the database, the attached one or more network data attributes attached to the incoming data as one or more network data attributes of the network data model;
   determine whether the container is communicating with a second container within a shared pod, wherein the shared pod comprises one or more containers including the container and the second container on the host machine; and
   for intrapod outgoing data transmitted by the container to the second container, transmit a memory pointer associated with the location of the intrapod outgoing data.

2. The system of claim 1, wherein the instructions are further executable by the processor to:
   attach one or more network data attributes associated with outgoing data, wherein outgoing data is transmitted by the container and the one or more network data attributes attached to the outgoing data are based, at least in part, on the container; and
   transmit, via the network interface, the outgoing data.

3. The system of claim 1, wherein the instructions are further executable by the processor to:
   for intrapod incoming data, receive the memory pointer associated with the location of the intrapod incoming data.

4. The system of claim 1, wherein the instructions are further executable by the processor to:
   add, via the database, an additional attribute to the one or more network data attributes of the network data model.

5. The system of claim 1, wherein the instructions are further executable by the processor to:
   remove, via the database, at least one of the one or more network data attributes from the network data model.

6. The system of claim 1, wherein the instructions are further executable by the processor to:
   prioritize forwarding of the incoming data based, at least in part, on the one or more attached network data attributes.

7. The system of claim 1, wherein the one or more network data attributes includes at least a quality of service, security, routing, switching, proof of origin, proof of delivery, and packet behavior monitoring associated with data received and transmitted by the container.

8. An apparatus comprising:
a processor; and
non-transitory computer readable media comprising instructions executable by the processor to:
obtain, via a database, a network configuration;
spawn a container according to the network configuration, wherein the container is configured, based on the network configuration, to be coupled to a network overlay via a network interface;
receive, via the network interface, incoming data associated with the container, the incoming data having attached one or more attached network data attributes;
identify, via the database, the attached one or more network data attributes attached to the incoming data as one or more network data attributes of a network data model;
determine whether the container is communicating with a second container within a shared pod, wherein the shared pod comprises one or more containers including the container and the second container on the host machine; and
for intrapod outgoing data transmitted by the container to the second container, transmit a memory pointer associated with the location of the intrapod outgoing data,
wherein the database comprises a multi-dimensional data store configured to define the network data model, wherein the network data model is configured to support one or more network data attributes.

9. The apparatus of claim 8, wherein the instructions are further executable by the processor to:
attach one or more network data attributes associated with outgoing data, wherein outgoing data is transmitted by the container and the one or more network data attributes attached to the outgoing data are based, at least in part, on the container; and
transmit, via the network interface, the outgoing data.

10. The apparatus of claim 8, wherein the instructions are further executable by the processor to:
for intrapod incoming data, receive the memory pointer associated with the location of the intrapod incoming data.

11. The apparatus of claim 8, wherein the instructions are further executable by the processor to:
add, via the database, an additional attribute to the one or more network data attributes of the network data model.

12. The apparatus of claim 8, wherein the instructions are further executable by the processor to:
remove, via the database, at least one of the one or more network data attributes from the network data model.

13. The apparatus of claim 8, wherein the instructions are further executable by the processor to:
prioritize forwarding of the incoming data based, at least in part, on the one or more attached network data attributes.

14. A method comprising:
defining, at an edge database, a network data model configured to support one or more network data attributes;
providing, via the edge database, a network configuration;
obtaining, via an orchestrator, the network configuration from the edge database;
spawning, via the orchestrator, a container according to the network configuration, wherein spawning the container further comprises coupling the container, based on the network configuration, to a network overlay via a network interface;
receiving, via the network interface, incoming data associated with the container, the incoming data having attached one or more attached network data attributes;
identifying, via the edge database, the attached one or more network data attributes attached to the incoming data as one or more network data attributes of the network data model;
determine whether the container is communicating with a second container within a shared pod, wherein the shared pod comprises one or more containers including the container and the second container on the host machine; and
for intrapod outgoing data transmitted by the container to the second container, transmit a memory pointer associated with the location of the intrapod outgoing data.

15. The method of claim 14, further comprising:
for intrapod incoming data, receiving the memory pointer associated with the location of the intrapod incoming data.

16. The method of claim 14 further comprising:
add, via the edge database, an additional attribute to the one or more network data attributes of the network data model; and
removing, via the edge database, at least one of the one or more network data attributes from the network data model.

17. The method of claim 14 further comprising:
prioritizing forwarding of the incoming data based, at least in part, on the one or more attached network data attributes.

* * * * *